No. 774,252.

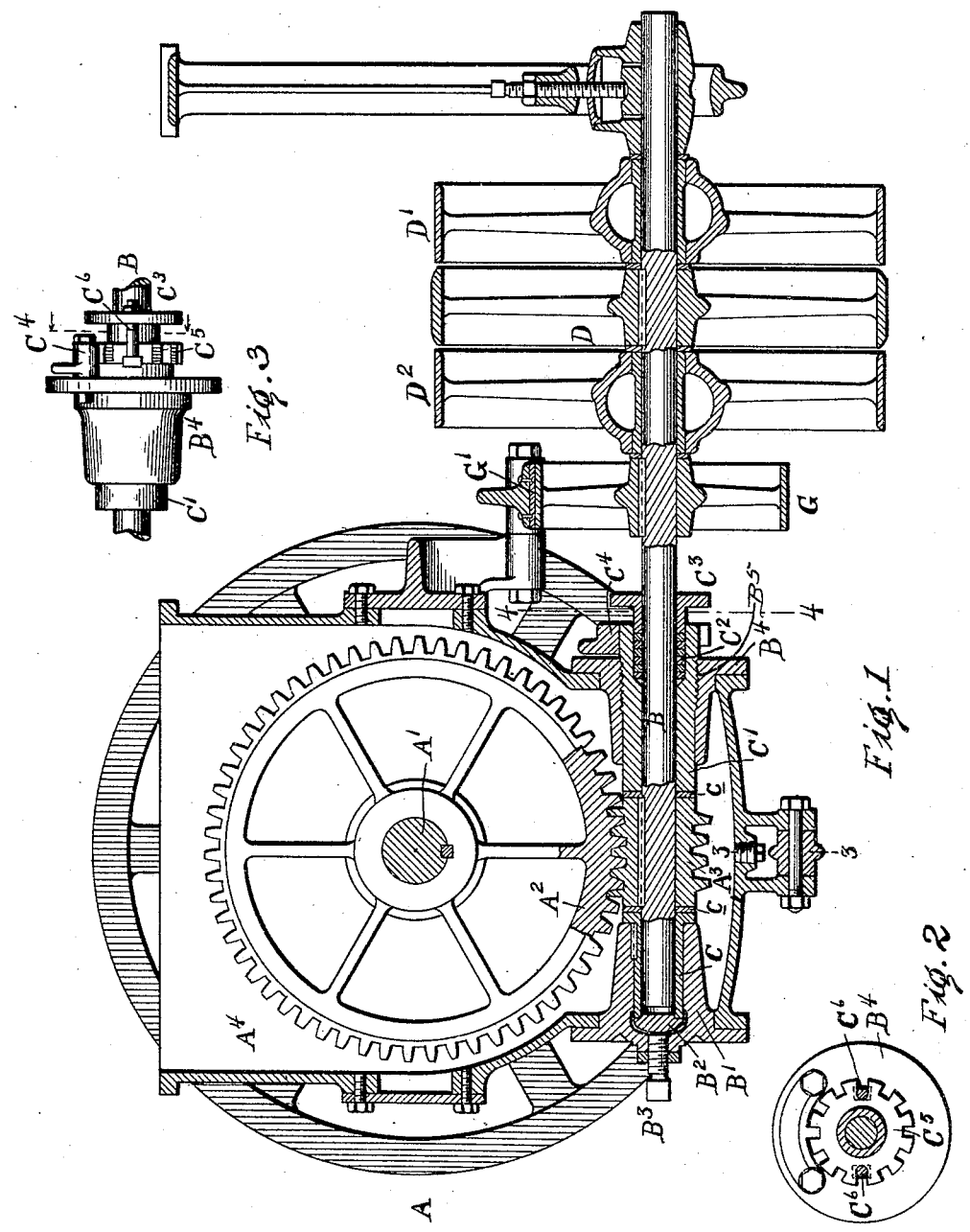

Patented November 8, 1904.

UNITED STATES PATENT OFFICE.

WILLIAM H. HULTGREN, OF PHILADELPHIA, PENNSYLVANIA, ASSIGNOR TO OTIS ELEVATOR COMPANY, A CORPORATION OF NEW JERSEY.

GEARING.

SPECIFICATION forming part of Letters Patent No. 774,252, dated November 8, 1904.

Application filed April 26, 1904. Serial No. 204,966. (No model.)

*To all whom it may concern:*

Be it known that I, WILLIAM H. HULTGREN, of the city and county of Philadelphia, State of Pennsylvania, have invented an Improvement in Gearing, of which the following is a specification.

My invention has reference to gearing for elevators and mechanical devices generally; and it consists of certain improvements which are fully set forth in the following specification and shown in the accompanying drawings, which form a part thereof.

The object of my invention is to provide means for operating the cable-winding drum which shall embody special adjusting devices for the worm-gearing to compensate for wear.

My invention further comprehends worm and worm-wheel gearing for driving the drum, combined with adjustable sleeve-bearings for the worm-shaft adapted to be adjusted from outside of the inclosing casing to accurately center the worm relatively to the worm-wheel, a feature of special importance in connection with the use of the "Hindley" type of worm.

My invention also includes minor features of construction, which, together with those above mentioned, will be better understood by reference to the drawings, in which—

Figure 1 is a side sectional elevation of the devices of an elevator embodying my invention. Fig. 2 is a cross-section of a portion of the same on line 4 4 of Fig. 1, and Fig. 3 is is an elevation of a portion of the adjusting devices for the worm-shaft.

A is the winding-drum and is driven by a shaft $A'$. Secured to the shaft $A'$ is a worm-wheel $A^2$, which is driven by a worm $A^3$, secured to the worm-shaft B. The worm-wheel and worm are inclosed within a casing $A^4$. The worm-shaft B is driven by a pulley D and has loosely journaled upon it the pulleys $D'$ $D^2$ for normally supporting the driving-belts when not on the pulley D, as is well known in elevators of this type.

G is a brake-pulley acted upon by a brake-shoe $G'$.

The end of the worm-shaft B is journaled in a bushing C, adjustable longitudinally by a screw $B^3$, carried in the head $B'$, secured to the casing $A^4$. A spline or key $b$ between the bushing C and head $B'$ prevents the bushing from rotating. A cap $B^2$ fits the end of the bushing and enables the screw $B^3$ to act centrally upon said bushing for its adjustment. The bushing is preferably flanged, and between its flanged end and the worm I arrange an antifriction-collar $c$ to take the thrust and reduce the wear. The other end of the shaft B is journaled in an adjustable sleeve $C'$, which is directly screwed at $B^5$ into a head $B^4$, secured to the casing $A^4$. A collar $c$ is also interposed between the end of the sleeve $C'$ and the worm to reduce friction and wear. The sleeve $C'$ has its outer end extended beyond the head $B^4$ and is provided with a notched flange $C^5$, which is locked in position when properly adjusted by a locking-plate $C^4$, which is bolted in position when the adjustment is made. The end of the sleeve $C'$ is further provided with a stuffing-box containing the packing $C^2$ and a gland $C^3$, which latter is held in place by the bolts $C^6$, passing through the gland and carried by the notched flange of the sleeve $C'$, as shown in Figs. 2 and 3. By these adjustable parts the worm $A^3$ can be adjusted longitudinally, so as to be accurately centered relative to the axis of the worm-wheel $A^2$. While this adjustment is not necessary with ordinary worm and worm-wheel construction, it is a feature of very great importance in the use of that type of worm known as the "Hindley" worm, in which the teeth fit closely to the teeth of the worm-wheel throughout the entire length of the worm.

While my improvements are especially designed for elevator-hoisting machines and are shown as applied thereto, it is to be understood that I do not confine myself to any particular use of the invention, as it may be applied to any worm and worm-wheel gearing, and, further, while it is specially intended for use with what is known as the "Hindley" worm it may be adapted to any other worm.

While I have shown the various details in the form which I have found excellently adapted for the purpose of my invention in commercial use, I do not restrict myself to the minor details, as they may be modified in various ways without departing from the spirit of the invention.

Having now described my invention, what I claim as new, and desire to secure by Letters Patent, is as follows:

1. The combination of a worm-wheel, a worm of the Hindley form meshing with the worm-wheel, a worm-shaft, a casing or frame inclosing the worm, adjustable bearings for the worm-shaft upon each end of the frame adapted for longitudinal adjustment, and supporting means for the said bearings secured to the casing.

2. The combination of a worm-wheel, a worm meshing with the worm-wheel, a worm-shaft, a casing or frame inclosing the worm, adjustable bearings for the worm-shaft upon each end of the frame adapted for longitudinal adjustment, supporting means for the said bearings secured to the casing, an adjusting-screw extending to the outside of the casing for adjusting one of the bearings, means for holding the other bearing in its adjusted position, and a stuffing-box carried by said last-mentioned bearing through which the worm-shaft extends.

3. The combination of a worm-wheel, a worm meshing with the worm-wheel, a worm-shaft, a casing or frame inclosing the worm, adjustable bearings for the worm upon each end of the frame adapted for longitudinal adjustment, supporting means for the said bearings secured to the casing, means for holding the bearings in their adjusted position to hold the worm in the central position, and a stuffing-box carried by one of the bearings and through which the worm-shaft extends.

4. The combination of a worm-wheel, a worm meshing with the worm-wheel, a casing or frame surrounding the worm, a worm-shaft for rotating the worm, an annular bearing surrounding the worm-shaft and adjustably secured through the side of the casing, and having a notched flange outside of the casing, a locking device having a tooth adapted to engage with the notched flange for holding the bearing against rotation within the casing after adjustment, and a stuffing-box carried by the bearing and surrounding the worm-shaft.

5. The combination of a worm-wheel, a worm meshing with the worm-wheel, a casing or frame surrounding the worm, a worm-shaft, a head $B^4$ secured to the casing and surrounding the worm-shaft, an adjustable bearing $C'$ in which the worm-shaft is journaled guided within the head $B^4$ and having a screw-threaded connection therewith at $B^5$, and means to hold the said bearing against rotation when properly adjusted.

6. The combination of a worm-wheel, a worm meshing with the worm-wheel, a casing surrounding the worm, a worm-shaft, a head $B^4$ secured to the casing and surrounding the worm-shaft, an adjustable bearing $C'$ in which the worm-shaft is journaled guided within the head $B^4$ and having a screw-threaded connection therewith at $C^2$, means to hold the said threaded connection therewith and also having its perimeter outside of the support notched at $B^5$, and means to hold the said bearing against rotation when properly adjusted consisting of a toothed plate $C^4$ fitting notches in the perimeter of the sleeve.

7. The combination of a worm-wheel, a worm meshing with the worm-wheel, a casing or frame surrounding the worm, a worm-shaft, a head $B^4$ secured to the casing and surrounding the worm-shaft, an adjustable bearing $C'$ in which the worm-shaft is journaled guided within the head $B^4$ and having a screw-threaded connection therewith at $B^5$, and means to hold the said bearing against rotation when properly adjusted, and a stuffing-box surrounding the worm-shaft and carried by the adjustable bearing.

In testimony of which invention I have hereunto set my hand.

WILLIAM H. HULTGREN.

Witnesses:
R. M. KELLY,
WILLIAM ROONEY.